(12) United States Patent
Sotzing et al.

(10) Patent No.: US 10,002,686 B2
(45) Date of Patent: Jun. 19, 2018

(54) METHOD OF INFUSING FIBROUS SUBSTRATE WITH CONDUCTIVE ORGANIC PARTICLES AND CONDUCTIVE POLYMER; AND CONDUCTIVE FIBROUS SUBSTRATES PREPARED THEREFROM

(71) Applicant: THE UNIVERSITY OF CONNECTICUT, Farmington, CT (US)

(72) Inventors: Gregory Sotzing, Storrs, CT (US); Douglas Adamson, Mansfield Center, CT (US); Steven Woltornist, Stafford Springs, CT (US); Fahad Alamer, Mansfield Center, CT (US)

(73) Assignee: THE UNIVERSITY OF CONNECTICUT, Farmington, CT (US)

( * ) Notice: Subject to any disclaimer, the term of this patent is extended or adjusted under 35 U.S.C. 154(b) by 73 days.

(21) Appl. No.: 15/124,530

(22) PCT Filed: Mar. 9, 2015

(86) PCT No.: PCT/US2015/019407
§ 371 (c)(1),
(2) Date: Sep. 8, 2016

(87) PCT Pub. No.: WO2015/138298
PCT Pub. Date: Sep. 17, 2015

(65) Prior Publication Data
US 2017/0018326 A1    Jan. 19, 2017

Related U.S. Application Data

(60) Provisional application No. 61/951,802, filed on Mar. 12, 2014.

(51) Int. Cl.
*H01B 1/24* (2006.01)
*B32B 27/12* (2006.01)
(Continued)

(52) U.S. Cl.
CPC ............... *H01B 1/24* (2013.01); *B32B 5/022* (2013.01); *B32B 5/024* (2013.01); *B32B 27/12* (2013.01);
(Continued)

(58) Field of Classification Search
CPC ............ B32B 2255/02; B32B 2255/26; B32B 2262/0253; B32B 2262/0261;
(Continued)

(56) References Cited

U.S. PATENT DOCUMENTS 4,983,814 A    1/1991    Ohgushi et al.
5,830,529 A    11/1998   Ross
(Continued)

FOREIGN PATENT DOCUMENTS

JP    2008138300 A    6/2008
JP    2008179923 A    8/2008
(Continued)

OTHER PUBLICATIONS

Adiprene Duracast E900, Chemtura Technical Information, Oct. 20, 2008, 4 pages.
(Continued)

*Primary Examiner* — Mark T Kopec
*Assistant Examiner* — Jaison P Thomas
(74) *Attorney, Agent, or Firm* — Cantor Colburn LLP

(57) ABSTRACT

A method of infusing fibrous substrates with conductive organic particles (e.g. graphene/graphite) and conductive polymer, and the resulting electrically conductive fibrous substrates prepared therefrom are disclosed. All organic electrically conductive fibrous substrates prepared from syn-
(Continued)

thetic fibrous substrates, graphene/graphite, and conductive polymer have been prepared having high electrical conductivity.

19 Claims, 6 Drawing Sheets

(51) Int. Cl.
  B32B 5/02 (2006.01)
  H01B 1/12 (2006.01)
(52) U.S. Cl.
  CPC .......... H01B 1/127 (2013.01); B32B 2255/02 (2013.01); B32B 2255/26 (2013.01); B32B 2262/0253 (2013.01); B32B 2262/0261 (2013.01); B32B 2262/0276 (2013.01); B32B 2262/0292 (2013.01); B32B 2264/102 (2013.01); B32B 2264/108 (2013.01); B32B 2307/202 (2013.01); B32B 2307/412 (2013.01); B32B 2457/00 (2013.01)
(58) Field of Classification Search
  CPC .... B32B 2262/0276; B32B 2262/0292; B32B 2264/102; B32B 2264/108; B32B 2307/202; B32B 2307/412; B32B 2457/00; B32B 27/12; B32B 5/022; B32B 5/024; H01B 1/24; H01B 1/127
  See application file for complete search history.

(56) References Cited

U.S. PATENT DOCUMENTS

| | | | |
|---|---|---|---|
| 6,072,619 A | 6/2000 | Kiryuschev et al. | |
| 6,103,640 A | 8/2000 | Yoshikawa et al. | |
| 6,184,280 B1 | 2/2001 | Shibuta | |
| 6,919,105 B2 | 7/2005 | Xue et al. | |
| 7,321,012 B2 | 1/2008 | Sotzing | |
| 7,413,802 B2 | 8/2008 | Karayianni et al. | |
| 7,455,935 B2 | 11/2008 | Abe et al. | |
| 7,740,656 B2 | 6/2010 | Mensah et al. | |
| 8,107,153 B2 | 1/2012 | Sotzing et al. | |
| 8,178,629 B2 | 5/2012 | Sotzing et al. | |
| 8,760,748 B2 | 6/2014 | Sotzing et al. | |
| 8,908,252 B2 | 12/2014 | Sotzing et al. | |
| 9,644,313 B2 | 5/2017 | Sotzing | |
| 2001/0045547 A1* | 11/2001 | Senecal | D01D 5/0007 252/501.1 |
| 2005/0137542 A1 | 6/2005 | Underhill et al. | |
| 2005/0237594 A1 | 10/2005 | Ho et al. | |
| 2005/0255139 A1 | 11/2005 | Hurd et al. | |
| 2006/0112599 A1 | 6/2006 | Braynock et al. | |
| 2006/0159907 A1 | 7/2006 | Percec et al. | |
| 2006/0263553 A1 | 11/2006 | Yamada et al. | |
| 2006/0281382 A1 | 12/2006 | Karayianni et al. | |
| 2007/0042179 A1 | 2/2007 | Karayianni et al. | |
| 2007/0054577 A1 | 3/2007 | Avloni | |
| 2007/0065586 A1 | 3/2007 | Tao et al. | |
| 2007/0078324 A1 | 4/2007 | Wijisiriwardana | |
| 2007/0089845 A1 | 4/2007 | Sotzing et al. | |
| 2007/0100666 A1 | 5/2007 | Stivoric et al. | |
| 2007/0215232 A1 | 9/2007 | Hassonjee et al. | |
| 2007/0222909 A1 | 9/2007 | Slikkerveer et al. | |
| 2008/0058633 A1 | 3/2008 | Boyden et al. | |
| 2008/0170982 A1 | 7/2008 | Zhang et al. | |
| 2008/0318002 A1 | 12/2008 | Burr et al. | |
| 2009/0005748 A1 | 1/2009 | Ales et al. | |
| 2010/0028559 A1 | 2/2010 | Yan et al. | |
| 2010/0163283 A1 | 7/2010 | Hamedi et al. | |
| 2010/0245971 A1 | 9/2010 | Sotzing et al. | |
| 2010/0294335 A1 | 11/2010 | Huang et al. | |
| 2011/0027869 A1 | 2/2011 | Hatton et al. | |
| 2011/0168951 A1 | 7/2011 | Sotzing | |
| 2011/0304964 A1 | 12/2011 | Fleischer et al. | |
| 2011/0315204 A1* | 12/2011 | Gleason | B82Y 10/00 136/256 |
| 2012/0153236 A1 | 6/2012 | Cakmak et al. | |
| 2012/0164429 A1 | 6/2012 | Shah et al. | |
| 2012/0224247 A1* | 9/2012 | Sotzing | H01M 4/02 359/265 |
| 2012/0274616 A1 | 11/2012 | Scribner et al. | |
| 2013/0338472 A1 | 12/2013 | Macia Barber et al. | |
| 2014/0011004 A1* | 1/2014 | Sotzing | B41M 3/006 428/196 |
| 2014/0318699 A1 | 10/2014 | Longinotti-Buitoni et al. | |
| 2015/0017421 A1* | 1/2015 | Sotzing | H01B 1/127 428/323 |
| 2016/0258110 A1* | 9/2016 | Alamer | D06M 15/3562 |
| 2016/0310032 A1 | 10/2016 | Sotzing et al. | |
| 2016/0312044 A1 | 10/2016 | Sotzing | |
| 2016/0315380 A1 | 10/2016 | Sotzing | |

FOREIGN PATENT DOCUMENTS

| | | |
|---|---|---|
| WO | 0057238 A1 | 9/2000 |
| WO | 2006051380 A1 | 5/2006 |
| WO | 2006051384 A1 | 5/2006 |
| WO | 2007008977 A1 | 1/2007 |
| WO | 2007008978 A2 | 1/2007 |
| WO | 2007099889 A1 | 7/2007 |
| WO | 2008066458 A1 | 6/2008 |
| WO | 2008098136 A1 | 8/2008 |
| WO | 2009025849 A1 | 2/2009 |
| WO | 2010022353 A1 | 2/2010 |
| WO | 2010114718 A1 | 10/2010 |
| WO | 20100141743 A1 | 12/2010 |
| WO | 2013096356 A1 | 6/2013 |

OTHER PUBLICATIONS

Alemu et al., "Highly conductive PEDOT:PSS electrode by simple film treatment with methanol for ITO-free polymer solar cells." Energy Environ. Sci. 2012, 5, 9662.
Aleshin et al., "Electronic transport in doped poly (3,4-ethylenedioxythiophene) near the metal-insulator transition." Synth. Met. 90, 61-68 (1997).
ChemFiles, Enabling Technologies, Ionic Liquids, vol. 5 No. 6 (2005) 24 pages.
Coating Guide Clevios TM P Formulations. 1-12 (2012) http://www.heraeus-clevios.com/media/webmedia_local/media/datenblaetter/Clevios_P_coating_guide_08-03-18jb2.pdf.
Crispin et al., "Conductivity, Morphology, Interfacial Chemistry, and Stability of Poly(3,4-ethylene dioxythiophene)-Poly (styrene sulfonate): A Photoelectron Spectroscopy Study", Journ. of Polym. Sci. Part B: Polymer Physics, vol. 41, No. 21, Nov. 11, 2003.
Fahad (2013) Thesis Ch. 6-7, pp. 129-182.
Fuest, Polyurethane Elastomers, Rubber Technology, 2001, 24 pages.
Groenendaal, et al. Its Derivatives: Past , Present , and Future**. Adv. Mater. 12, 481-494 (2000).
Hiremath et al., "Simple setup to measure electrical properties of polymeric films." Mulimani, Rev. Sci. Instrum. 2006, 77, 126106.
Invernale et al., "All Organic Electrochromic Spandex", Department of Chemistry and the Polymer Program, University of Connecticut, Storrs, Connecticut, USA, pp. 296-300, including supplemental and supporting information; 2010 American Chemical Society; vol. 2, No. 1.
Invernale et al., "The Effects of Colored Base Fabric on Electrochromic Textile", University of Connecticut, Department of Chemistry and the Polymer Program, Storrs, Connecticut, USA, pp. 1-16, Jan. 4, 2010.
Kim et al. "Highly conductive PEDOT:PSS nanofibrils induced by solution-processed crystallization." Adv. Mater. 26, 2268-72, 2109 (2014).
Laforgue, "Electrically controlled colour-changing textiles using the resistive heating properties of PEDOT nanofibers Laforgue," A. 2010 Journal of Materials Chemistry 20 (38) , pp. 8233-8235.

(56) References Cited

OTHER PUBLICATIONS

Lee (2013) Flexible graphene woven fabrics for touch sensing. Applied Physics Letters, 102 (16), 163117; 5 pages.
Li et al., "Synthesis and characterization of mixing sof-segmented waterborne polyurethane polymer electrolyte with room temperature ionic liquid", Chinese Chemical Letters 20, 2009, pp. 519-522.
Lomax, "Breathable polyurethane membranes for textile and related industries", J. Mater. Chem. 17, 2007, pp. 2775-2784.
McCulloch, I. et al. "Liquid-crystalline semiconducting polymers with high charge-carrier mobility." Nat. Mater. 5, 328-33 (2006).
Mengistie, et al., Highly Conductive PEDOT:PSS Treated with Formic Acid for ITO-Free Polymer Solar Cells. ACS Appl. Mater. Interfaces 6, 2292-2299 (2014).
Molina, "Electrochemical characterization of reduced graphene oxide-coated polyester fabrics." Electrochimica Acta, (2013) 93, pp. 44-52.
Nardes et al., "A Morphological Model for the Solvent-Enhanced Conductivity of PEDOT:PSS Thin Films." Adv. Funct. Mater. 18, 865-871 (2008).
Negru (2012) Electrical conductivity of woven fabrics coated with carbon black particles. Fibers and Textiles. 20(1 (90)), pp. 53-56.
Okuzaki, WIPO Publication No. WO2007099889A1_Abstract of published PCT Application No. PCT/JP2007/053467 filed on Feb. 26, 2007 and published on Sep. 7, 2007, 1 page.
Ouyang, J. et al. "On the mechanism of conductivity enhancement in poly(3,4-ethylenedioxythiophene):poly(styrene sulfonate) film through solvent treatment." Polymer (Guildf). 45, 8443-8450 (2004).
Padilla et al., "Electrochemical Study of Dual Conjugated Polymer Electrochromic Devices", Journal of Electroanalytical Chemistry (2007), 609(2), 75-84.
Padilla et al., "High Contrast Solid-State Electrochromic Devices from Substituted 3, 4-Propylenedioxythiophenes Using the Dual Conjugated Polymer Approach", Synthetic Metals (2007), 157(6-7), 261-268.
Padilla et al., "Maximum Contrast from an Electrochromic Material", Electrochemistry Communications (2007), 9(8), 1931-1935.
Reynolds et al., "Unique Variable-Gap Polyheterocycles for High-Contrast Dual Polymer Electrochromic Devices", Synthetic Metals (1997), 85(1-3), 1295-1298.
Reynolds, (1996) Controlled gap polymers for high contrast electrochromic devices. Polymeric Materials Science and Engineering, 75 pp. 414-415.
Rowley et al., "New Electrochromic Materials", Science Progress (2002), 85 (3), 243-262.
Rymarczyk et al., "A novel ternary polymer electrolyte for LMP batteries based on thermal cross-linked poly (urethane acrylate) in presence of a lithium salt and an ionic liquid", European Polymer Journal 44, 2008, pp. 2153-2161.
Santhosh et al., "Preparation and properties of new cross-linked polyurethane acrylate elctrolytes for lithium batteries", Journal of Power Sources 160, 2006, pp. 609-620.
Sapp et al., "Rapid Switching Solid State Electrochromic Devices Based on Complementary Conducting Polymer Films", Polymer Films (Weinheim, Germany) (1996), 8(10), 808-811.
Seiko Epson Corp, JP2008179923, Abstract, Aug. 7, 2008, 2 pages.
Seok-Joo Wang, "Effect of Silica Nanoparticle Content on the Structure and Electrostatic Bonding of PEDOT:PSS, Molecular Crystals and Liquid Crystals," (2012) 568:1, 179-185.
Seshardi et al., "Optimization, Preparation, and Electrical Short Evaluation for 30 cm2 Active Area Dual Conjugated Polymer Electrochromic Wndows", Organic Electronics (2007), 8(4), 367-381.
Shateri-Khalilabad (2013) Fabricating electroconductive cotton textiles using graphene. Carbohydrate polymers, 96(1), 190-5, 6 pages.
Skotheim et al., "Handbook of Conducting Polymers", 3rd Ed., 2007, 67 pages.
Sotzing et al., Materials Research Society, 2011 Spring Meeting, Online Abstract Feb. 1, 2011, 1 page.
Suh et al., Effect of Fabric Substrate and Coating Material on the Quality of Conductive Printing, The Journal of the Textile Institute, 2013, vol. 104, No. 2, 213-222.
Voight et al., "Charge effects on the Formation of Multilayer conatining Strong Polyelectrolytes." J. Polym. Sci. Part B Polym. Phys. 2003, 41, 2561.
Wang et al., Effect of Silica Nanoparticle Content on the Structure and Electrostatic Bonding of PEDOT:PSS, Mol. Cryst. Liq. Cryst., vol. 568: pp. 179-185, 2012.
Woltornist et al., "Preparation of conductive graphene/graphite infused fabrics using an interface trapping method" Carbon, vol. 81, 38-42 (2015) available online Sep. 19, 2014.
Xia et al., "PEDOT:PSS films with significantly enhanced conductivities induced by preferential solvation with cosolvents and their application in polymer photovoltaic cells." J. Mater. Chem. 21, 4927-4936 (2011).
Xia et al., "Significant Conductivity Enhancement of Conductive Poly(3,4-ethylenedioxythiophene): Poly (styrenesulfonate) Films through a Treatment with Organic Carboxylic Acids and Inorganic Acids." ACS Appl. Mater. Interfaces 2, 474-483 (2010).
Yamashita (2013) Fabrication and evaluation of a conductive polymer coated ealstomer contact structure for woven electronic textile. Sensors and Actuators A: Physical, 195, pp. 213-218.
International Preliminary Report on Patentability for International Application No. PCT/US2015/019407, International Filing Date Mar. 9, 2015, dated Sep. 22, 2016, 8 pages.
Ding, Yujie et al. "Conductivity trends of PEDOT-PPS impregnated fabric and the effect of conductivity on electrochromic textile." ACS Applied Materials & Interfaces, 2010, vol. 2, No. 6, pp. 1588-1593.
International Search Report; International Application No. PCT/US2015/019407; International Filing Date Mar. 9, 2015; International Search Report dated May 29, 2015; 3 pages.
Written Opinion of the International Searching Authority; International Application No. PCT/US2015/019407; International Filing Date Mar. 9, 2015; dated May 29, 2015; 7 pages.
Hair, Michael L.; "Hydroxyl Groups on Silica Surface"; Journal of Non-Crystalline Solids, vol. 19; Dec. 1975; pp. 299-309.

* cited by examiner

US 10,002,686 B2

METHOD OF INFUSING FIBROUS SUBSTRATE WITH CONDUCTIVE ORGANIC PARTICLES AND CONDUCTIVE POLYMER; AND CONDUCTIVE FIBROUS SUBSTRATES PREPARED THEREFROM

CROSS REFERENCE TO RELATED APPLICATIONS

This application is a National Stage application of PCT/US2015/019407, filed Mar. 9, 2015, which claims the benefit of U.S. Provisional Application No. 61/951,802, filed Mar. 12, 2014, both of which are incorporated by reference in their entirety herein.

BACKGROUND

Electrically conductive fabric has gained increasing attention for its potential application in a wide variety of devices including wearable electronics. Known methods of imparting conductivity to fabric, however, such as the incorporation of metals can result in issues such as loss of flexibility, weight increase, or the changing of texture.

Known approaches to form conductive fabric include use of graphene fibers from graphene oxide, infusing fabric with graphene oxide followed by reduction to graphene, transferring a patterned film made through chemical vapor deposition (CVD), and dispersing graphene with a surfactant that is then removed after infusion into the fabric with nitric acid. Unfortunately, graphene produced through the reduction of graphene oxide has severely reduced electrical and mechanical properties, CVD is not cost effective, and harsh chemical treatments that may affect fabrics are required to remove surfactants.

Intrinsically conducting polymers find wide application because of their conductive properties, low cost in manufacturing, mechanical flexibility, durability, and ease of processing. Intrinsically conducting polymers exhibit remarkably high conductivity and electrochromism, the ability to change colors when a potential is applied. In the field of smart textiles, conductive fabrics can be prepared using various methods; one method being to coat the fibers with conductive polymers.

There remains a need in the art for new, electrically conductive fabrics and textiles and simple, cost effective, and scalable processes to create such electrically conductive textiles.

BRIEF SUMMARY

In one embodiment, an electrically conductive fibrous substrate comprises a fibrous substrate comprising fibers; a conductive polymer; and a conductive organic particle, wherein the fibrous substrate is infused with the conductive polymer and conductive organic particle.

In another embodiment, a method of making an electrically conductive fibrous substrate comprises infusing a fibrous substrate with a conductive organic particle to form a conductive organic particle infused fibrous substrate; and infusing the conductive organic particle infused fibrous substrate with a conductive polymer to form an electrically conductive fibrous substrate In another embodiment, an electrically conductive fibrous substrate comprises a fibrous substrate comprising polymeric fibers optionally comprising desiccant nanoparticles; PEDOT:PSS; and graphene, graphite, or graphene and graphite, wherein the fibrous substrate is infused with the PEDOT:PSS and graphene, graphite, or graphene and graphite.

DETAILED DESCRIPTION

Figure 1A:
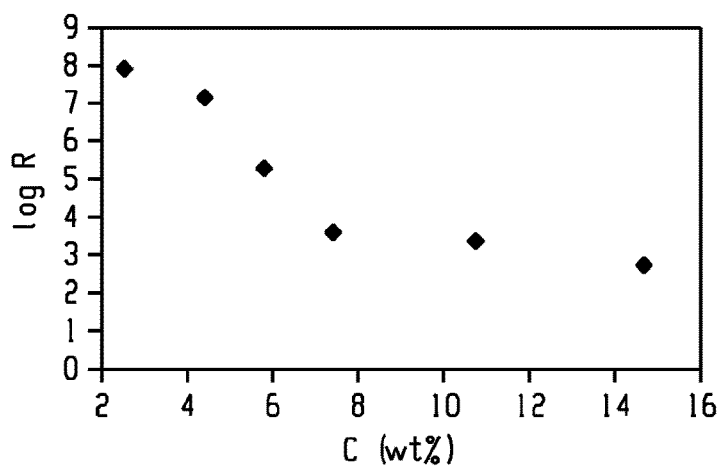
FIG. 1 (A) Sheet resistance as a function of concentration of graphene/graphite infused into PET non-woven fibrous substrate. The percolation threshold can be observed at around 7 weight percent (wt %). (B) Resistance versus temperature plot of the infused fibrous substrate having a clear semiconductor-metal transition observed at around 350° K (also in inset).

Disclosed herein are electrically conductive fibrous substrates and methods of making. The electrically conductive fibrous substrates generally contain infused conductive polymer and infused conductive organic particles in a fibrous substrate such as a fabric. The electrically conductive fibrous substrate maintains the flexibility of the original fibrous substrate material. The resulting conductive fibrous substrate is more cost effective than metal-based materials, there is no toxicity as compared to metal-based conductive fabrics, and it enables the preparation of wearable electronic devices.

In an embodiment, a method to infuse a fibrous substrate with an all organic graphene/graphite mix and conductive polymer to form a conductive fibrous substrate is disclosed. The resulting conductive fibrous substrate is a composite of the fibrous substrate, graphene/graphite, and conductive polymer and exhibits higher conductivity than a corresponding composition made from graphene/graphite or conductive polymer alone. As a composite, the conductive polymer and conductive organic particles are infused throughout the interstices of the fibrous substrate as opposed to merely being a film located at the surface of the substrate.

In one embodiment, a fibrous substrate is infused with graphene and/or graphite through a sonication process and then the graphene and/or graphite infused fibrous substrate is soaked in a solution or suspension of a conductive polymer, the substrate is removed from the solution/suspension, and dried to form a conductive fibrous substrate.

As discussed below, the conductive organic particle, desiccant nanoparticles, or a combination thereof can facilitate wicking of the conductive polymer into the fibrous substrate.

In an embodiment, the electrically conductive fibrous substrate exhibits semiconductive behavior at low temperature in the range of −173° C. to below 20° C. and metallic behavior at 20° C. and above.

In an embodiment, the electrically conductive fibrous substrate exhibits sheet resistances ranging anywhere from about 0.15 to about 10 Ohms/square depending upon the total amount of conductor.

The fibrous substrate can be infused with a conductive organic particle to form a conductive organic particle infused fibrous substrate. The conductive organic particle can be graphene, graphite, a combination of graphene and graphite, carbon nanotubes, buckyballs, "n-type" small molecules, or a combination thereof. Exemplary "n-type" small molecules include those commercially available from Sigma-Aldrich, including 2,9-bis[2-(4-chlorophenypethyl] anthra[2,1,9-def:6,5,10-d'e'f']diisoquinoline-1,3,8,10(2H,9H)tetrone; N,N'-bis(2,5-di-tert-butylphenyl)-3,4,9,10-perylenedicarboximide; 2,9-bis[2-(4-fluorophenyl)ethyl] anthra[2,1,9-def:6,5,10-d'e'f']diisoquinoline-1,3,8,10(2H,9H)tetrone; 2,9-bis[(4-methoxyphenyl)methyl]anthra[2,1,9-def:6,5,10-d'e'f']diisoquinoline-1,3,8,10(2H,9H)tetrone; N,N'-bis(3-pentyl)perylene-3,4,9,10-bis(dicarboximide); 5,5'''-bis(tridecafluorohexyl)-2,2':5',2'':5'',2'''-quaterthiophene; 2,2'-bis[4-(trifluoromethyl)phenyl]-5,5'-bithiazole; 5,10,15,20-tetraphenylbisbenz[5,6]indeno[1,2,3-cd:1',2',3'-1 m]perylene; 2,9-diheptylanthra[2,1,9-def:6,5,10-d'e'f'] diisoquinoline-1,3,8,10(2H,9H)tetrone; 2,7-dihexylbenzo [lmn][3,8]phenanthroline-1,3,6,8(2H,7H)-tetrone; 4-(2,3-dihydro-1,3-dimethyl-1H-benzimidazol-2-yl)-N,N-dimethylbenzenamine; 4-(1,3-dimethyl-2,3-dihydro-1H-benzoimidazol-2-yl)-N,N-diphenylaniline; N, N'-dimethyl-3,4,9,10-perylenedicarboximide; N,N'-dioctyl-3,4,9,10-perylenedicarboximide; N,N'-dipentyl-3,4,9,10-perylenedicarboximide; [6.6] Diphenyl C62 bis(butyric acid methyl ester); N,N'-diphenyl-3,4,9,10-perylenedicarboximide; 2,9-dipropylanthra[2,1,9-def6,5,10-d'e'f']diisoquinoline-1,3,8,10(2H,9H)tetrone; N,N'-ditridecylperylene-3,4,9,10-tetracarboxylic diimide; [5,6]-Fullerene-C70; Fullerene-C60; Fullerene-C84; 1',1",4',4"-tetrahydro-di[1,4] methanonaphthaleno[1,2:2',3',56,60:2",3"][5,6]fullerene-C60; 1',4'-Dihydro-naphtho[2',3':1,2][5,6]fullerene-C60; 1,4,5,8-naphthalenetetracarboxylic dianhydride; 1,2,3,4,5,6,7,8-octafluoro-9,10-bis[2-(2,4,6-trimethylphenypethynyl] anthracene; perylene-3,4,9,10-tetracarboxylic dianhydride; [6,6]-phenyl-C61 butyric acid butyl ester; [6,6]-phenyl C61 butyric acid methyl ester; [6,6]-phenyl C71 butyric acid methyl ester; [6,6]-phenyl-C61 butyric acid octyl ester; 7,7,8,8-tetracyanoquinodimethane; 2,3,5,6-tetrafluoro-7,7,8,8-tetracyanoquinodimethane; 1,3,8,10(2H,9H)-tetraone, 2,9-bis(2-phenylethyl)anthra[2,1,9-def:6,5,10-d'e'f']diisoquinoline; 1,3,6,8(2H,7H)-tetraone, 2,7-dicyclohexylbenzo [lmn][3,8]phenanthroline; [6,6]-thienyl C61 butyric acid methyl ester; and the like; or a combination thereof.

In an embodiment, the conductive organic particle used is graphene, graphite, or a combination of graphene and graphite to form a graphene and/or graphite infused fibrous substrate. Pristine graphene can be prepared by exfoliating pristine graphite via sonification in an organic solvent and water to yield graphene flakes. Exemplary organic solvents that can be used in the exfoliating process include alkyl (e.g. n-heptane) and aromatic (e.g. o-dichlorobenzene) solvents.

The total amount of conductive organic particle infused in the conductive fibrous substrate can be about 0.2 to about 20 wt %, specifically about 1.0 to about 16 wt %, and more specifically about 2.5 to about 13 wt % based on the total weight of the conductive fibrous substrate. The total amount of graphene and/or graphite infused in the conductive fibrous substrate can be about 0.2 to about 20 wt %, specifically about 1.0 to about 16 wt %, and more specifically about 2.5 to about 13 wt % based on the total weight of the conductive fibrous substrate.

Exemplary electrically conductive polymers that can be used to prepare the electrically conductive fibrous substrate include poly(3,4-ethylenedioxythiophene) ("PEDOT") including poly(3,4-ethylenedioxythiophene):poly(styrenesulfonate) ("PEDOT:PSS") aqueous dispersion, a substituted poly(3,4-ethylenedioxythiophene), a poly(thiophene), a substituted poly(thiophene), a poly(pyrrole), a substituted poly(pyrrole), a poly(aniline), a substituted poly(aniline), a poly(acetylene), a poly(p-phenylenevinylene) (PPV), a poly (indole), a substituted poly(indole), a poly(carbazole), a substituted poly(carbazole), a poly(azepine), a (poly)thieno [3,4-b]thiophene, a substituted poly(thieno[3,4-b]thiophene), a poly(dithieno[3,4-b:3',4'-d]thiophene), a poly (thieno[3,4-b]furan), a substituted poly(thieno[3,4-b]furan), a derivative thereof, a combination thereof, and the like.

The electrically conductive polymer can be used in an amount of about 0.1 to 16 wt % based on the total weight of the conductive fibrous substrate, specifically about 1.5 to about 7.0 wt %, and more specifically about 2.0 to about 6.3 wt %.

The electrical conductivity of the conductive fibrous substrate can be readily modified, if necessary, to meet the requirements of a desired application by doping with conventional acidic dopants (p-dopants) or basic dopants (n-dopants) known in the art. Suitable p-dopants include mineral acids such as HCl, $HNO_3$, $H_2SO_4$, $H_3PO_4$, HBr, and HI; organic sulfonic acids such as dodecyl benzene sulfonic acid, lauryl sulfonic acid, camphor sulfonic acid, organic acid dyes, methane sulfonic acid, and toluene sulfonic acid; polymeric sulfonic acids such as polystyrene sulfonic acid) and copolymers of styrene sulfonic acids; carboxylic acids such as adipic acid, azelaic acid, and oxalic acid; and polycarboxylic acids such as poly(acrylic acid), poly(maleic acid), poly(methacrylic acid), and copolymers formed from acrylic acid, maleic acid, and/or methacrylic acid. Conventional mixed dopants comprising one or more of the foregoing, such as a mixture of a mineral acid and an organic acid, can also be used to impart the desired electroactive character. Suitable basic dopants include, but are not limited to Na, K, Li, and Ca. Other suitable dopants include $I_2$, $PF_6$, $SbF_6$, and $FeCl_3$. In one embodiment the dopant is dimethylsulfoxide (DMSO).

The fibrous substrate that is used to prepare the conductive fibrous substrate can be a synthetic material, a natural material, or a combination thereof. The synthetic material can be made from any polymeric material such as nylon (e.g. nylon 6, nylon 66, nylon 610, nylon 12, co-polymerized nylon and the like), polyethylene terephthalate, polytrimethylene terephthalate, spandex (polyurethane-polyurea copolymer), polybutylene terephthalate, polypropylene terephthalate, polyurethane, polypropylene, polyethylene, polyester-based polyurethane, copolymers thereof, or a combination thereof. Natural materials that can be used to prepare the fibrous substrate include cotton, wool, and the like, or combinations thereof.

The term "fiber" as used herein includes single filament and multi-filament fibers, including yarn. No particular restriction is placed on the length of the fiber, other than practical considerations based on manufacturing considerations and intended use. Similarly, no particular restriction is placed on the width (cross-sectional diameter) of the fibers, other than those based on manufacturing and use considerations. The width of the fiber can be essentially constant, or vary along its length. For many purposes, the fibers can have a largest cross-sectional diameter of 2 nanometers and larger, for example up to 2 centimeters, specifically from about 5 nanometers to about 1 centimeter. In an embodiment, the fibers can have a largest cross-sectional diameter of about 5 to about 500 micrometers, more particularly, about 5 to about 200 micrometers, about 5 to about 100 micrometers, about 10 to about 100 micrometers, about 20 to about 80 micrometers, or about 40 to about 50 micrometers. In one embodiment, the conductive fiber has a largest circular diameter of about 40 to about 45 micrometers. Further, no restriction is placed on the cross-sectional shape of the fiber. For example, the fiber can have a cross-sectional shape of a circle, ellipse, square, rectangle, or irregular shape.

The term "fibrous substrate" can include flexible textile materials which may be woven or non-woven fibers. Woven materials include woven fabric formed by weaving, knitting, crocheting, knotting, pressing, braiding, or the like, multiple fibers together. Non-woven fabric materials may be formed by bonding multiple fibers together via a thermal, mechanical, or chemical process.

In an embodiment, a desiccant is used in the preparation of the polymeric fibrous substrate such that the fibers comprise desiccant particles wherein a portion of the desiccant particles are located at the surface of the fiber.

Exemplary desiccants include inorganic oxides such as silicon dioxide ($SiO_2$), titanium dioxide ($TiO_2$), aluminum oxide, calcium oxide, or a combination thereof. In a further embodiment, the desiccant is in particulate form having average particle size of about 1 nanometer (nm) to about 5 micrometer, specifically about 5 nm to about 500 nm, and more specifically about 10 nm to about 200 nm.

The desiccant nanoparticles can be present in an amount of about 0.01 to about 6.0 wt % by weight in the fiber, specifically about 0.05 to about 5.0 wt %, and more specifically about 0.1 to about 4.0 wt % by weight in the fiber.

The conductive fibrous substrate is flexible and can be used in smart textiles and other portable electronic devices. The technology is an enabling technology for all organic flexible electronics that can handle current densities comparable to copper. In an embodiment, the conductive fibrous substrate can act as an electrical wire. For example, a non-woven PET fabric containing 10.6 milligrams graphene/graphite and 5.78 wt % PEDOT:PSS in an electrical circuit with 2.87 Amp passing across the conductive fibrous substrate can light a 250 Watt light bulb.

Additionally, the conductive fibrous substrate can be an all organic replacement for indium tin oxide (ITO). It can also be used as a component in smart phones, tablets, e-readers; an electrochromic display e.g. in smart cards, smart price tags, and smart labels; used as a copper replacement; thin film batteries and energy storage; transparent solar cells; smart textiles e.g. for consumer products or patient monitoring devices embedded in textiles; vehicle and transportation systems including aerospace e.g. for wiring, electrochromic windows, and deicing applications, also conductive polymers also provide value to vehicles made from inherently nonconductive materials, which require static dissipation, monitoring, heating, or electrochromic characteristics; and wearable computers. The conductive fibrous substrate can find use as flexible display materials and other mobile devices which have a significant advantage in terms of durability of traditional devices, and for a new class of devices that are adaptable, or integral to textiles and garments. The electrical conductivity of the conductive fibrous substrate can be readily modified, if necessary, to meet the requirements of any of the previously mentioned applications by doping the polymers with conventional acidic dopants (p-dopants) and basic dopants (n-dopants) known in the art.

The electrically conductive fibrous substrate is easily scalable to high volume manufacture. In a general process, a fibrous substrate can be infused with a conductive organic particle to form a conductive organic particle infused fibrous substrate followed by infusing the conductive organic particle infused fibrous substrate with a conductive polymer to form the conductive fibrous substrate.

In an exemplary embodiment, the conductive organic particle is graphene, graphite, or a combination of graphene and graphite infused, for example, by an interfacial trapping method to form a graphene and/or graphite infused fibrous substrate. The interfacial trapping method generally involves exfoliating pristine graphite via sonification in an organic solvent and water to yield graphene flakes. Exemplary organic solvents that can be used in the exfoliating process include alkyl (e.g. n-heptane) and aromatic (e.g. o-dichlorobenzene) solvents. A fibrous substrate is then exposed to the sonicated mixture and sonicated to infuse the graphene and/or graphite into the fibrous substrate followed by removal of the substrate and drying to form a graphene and/or graphite infused fibrous substrate. In general, the weight/volume ratio of graphite to organic solvent is about 20 mg/mL and the weight/volume ratio of graphite to organic and aqueous solvent is about 10 mg/mL.

The electrically conductive polymer can then be infused in the conductive organic particle infused fibrous substrate using a variety of different techniques. For example drop casting, spray coating, ink jet coating, dip coating, gravure coating methods, extrusion coating, or a soaking process. Many of these processes are easily adaptable to large scale manufacture.

The techniques for infusing the electrically conductive polymer generally comprise forming a mixture of a solvent, the conductive polymer, and any optional additive (e.g. dopant), applying the mixture to a surface of the conductive organic particle infused fibrous substrate, and removing the solvent to form a conductive fibrous substrate infused with conductive organic particle, conductive polymer, and optional additive. The solvent can be water, an organic solvent, or a combination of water and a water miscible organic solvent. Exemplary organic solvents include dimethyl sulfoxide (DMSO), dichloromethane (DCM), toluene, N,N-dimethyl formamide (DMF), propylene glycol monomethyl ether acetate (PGMEA), propylene glycol monomethyl ether (PGME), acetone, methanol, ethanol, or a combination thereof. The solvent can be removed by air drying, vacuum drying, heating, or the like.

The solvent-conductive polymer mixture used to infuse the fibrous substrate can contain the electrically conductive polymer at a concentration of about 0.1 wt % to about 5 wt %, based on the total weight of the mixture, specifically about 0.2 to about 4 wt %, more specifically 0.3 to about 4 wt %, and still more specifically about 1.0 to about 3 wt %.

In an embodiment, a PEDOT:PSS aqueous dispersion is infused in a graphene and/or graphite infused fibrous polyethylene terephthalate substrate to yield highly conductive fibrous substrates having sheet resistances ranging from about 0.2 to about 100 Ohms/square.

The following illustrative examples are provided to further describe how to make and use the conductive fibrous substrates and are not intended to limit the scope of the claimed invention.

EXAMPLES

Example A

Infusion of Graphene/Graphite into a Polymeric Fibrous Substrate Using an Interfacial Trapping Method Fabric can be infused with graphene/graphite using an interfacial trapping method (S. J. Woltornist, A. J. Oyer, J.-M. Y. Carrillo, A. V Dobrynin, D. H. Adamson, ACS nano 2013, 7, 7062). A general method starts with 100 milligrams (mg) of pristine graphite (Asbury Carbons Grade 3243) placed in a glass scintillation vial. To this, 5 milliliters (mL) n-heptane (Fisher Scientific, 99% Optima) is added, followed by tip sonication using a Cole-Parmer 750 Watt Ultrasonic Processor (20 kHz operating at 40% power) for 15 minutes. Water (5 mL) is then added and the mixture is once again tip sonicated at 40% power for 15 minutes.

An oven dried (for weight measurement) 4 $cm^2$ piece of fabric (non-woven poly(ethyleneterephthalate) (PET)) is then placed into the scintillation vial. The vial is filled to the brim with n-heptane, and placed into a bath sonicator for 1 hour, after which the fabric is removed and dried in an oven. The fabric takes on a black color after treatment. After infusion of the graphene/graphite mixture, the fabric has the same general feel and flexibility as the initial sample. The method produces an electrically conductive fabric in a scalable and cost effective manner while retaining all of the fabric's mechanical strength. The solvents and graphene/graphite left in the vial may be reused for future samples.

Morphological Study: The initial tip sonication of the interfacial trapping method exfoliates the graphene, where it is then trapped at the interface between two immiscible solvents (here water and n-heptane). During the bath sonication, more graphene is exfoliated as the existing flakes are absorbed by the fabric. As seen in scanning electron microscopy images, the pristine graphite is trapped between the strands of the fabric, while the graphene flakes attach themselves to the strands themselves. This combination leads to percolation and high conductivity as the graphene flakes on the fibers of the fabric bridge any gaps between the larger graphite particles. Using this method, the fabric has been shown to hold up to 15 wt % graphene/graphite. X-ray diffraction (XRD) was used to confirm the presence of graphene/graphite in the sample compared to control fabric.

Percolation Threshold Study: Characterization was carried out using a four-line probe method with a Keithley 224 Programmable power supply ($I_{max}$=101.1×10$^{-3}$ A), while a 196 system DMA was used to measure the voltage. Resistance was first measured by creating an I-V plot with at least 10 data points. The sheet resistance $R_s$ was then determined using the relation $R_s$=R(w/l,) where w is the width of the sample and l is the distance between the leads. FIG. 1A shows the sheet resistance as a function of the concentration of graphene in the fabric. The measurements were carried out using four-line probe technique and all samples have the same area. It was noticed that the sheet resistance decreases by increasing graphene concentration in the fabric. At low concentration (2.5 wt %) graphene in the fabric, the sheet resistance was 77.9 MOhm/square (sq) and 7.41 wt % gave 3.6 KOhm/sq, which means that the sheet resistance decreased by four orders of magnitude. The 7.41 wt % concentration was determined to be the percolation threshold for the sheet resistance because above this concentration a one order of magnitude difference was noticed in the sheet resistance with a minimum value 0.57 KOhm/sq. This value is nearly one order of magnitude lower than the best value reported for graphene in fabric to date.

Figure 1B:
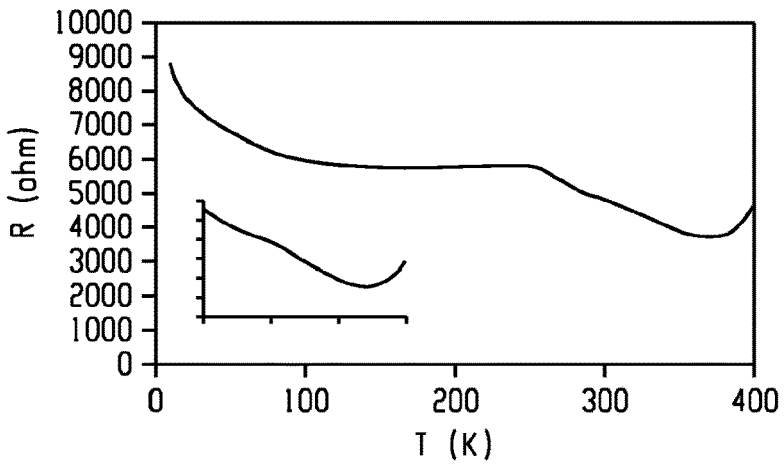

Temperature Study: The effect of temperature on the resistance of the infused fabric containing 25.8 mg graphene was measured over the range of 10-400° K. The sample had area 10×5 $mm^2$ and the measurements were made using a standard four-line probe technique in a Physical Property Measurement System (Quantum Design). As shown in FIG. 1B, the resistance decreases by increasing the temperature up to 350° K, which is consistent with semiconducting behavior with relatively constant resistance values from 100-250° K. The change in the resistance in the entire region is 5 KOhm. At 350° K the conductive fabric has a clear insulator-metal transition (inset of FIG. 1B).

Example 1. Preparation of Conductive Fibrous Substrate Containing Infused Graphene/Graphite and Conductive Polymer The process for fabrication of a highly conductive fibrous substrate can be achieved in two steps. In the first step, the graphite/graphene infused fibrous substrate is fabricated by means of the interfacial trapping method described in Example A. A mixture of 5 mL heptane and 100 mg of pristine graphite was sonicated for 30 minutes, and then 5 mL water was added to this mixture and sonicated for the same time. The mixture was then added to a vial containing a piece of non-woven poly(ethylene terephthalate) (PET) fabric fibrous substrate containing $SiO_2$ nanoparticles, 2.5× 2.5 $cm^2$, and sonicated for one hour, after which the fibrous substrate was removed and dried. The concentration of the mixture graphene/graphite is calculated by the mass difference between the original sample and the treated sample. In the second step, the dried graphite/graphene infused fibrous substrate is doped with the conductive polymer poly(3,4-ethylenedioxythiophene):poly(styrene sulfonate) (PEDOT: PSS aqueous dispersion Clevios™ PH1000 from Heraeus USA) incorporating 5 wt % dimethylsulfoxide (DMSO) by drop casting onto the substrate to saturation. The substrate was allowed to sit for 30 minutes and then dried in an oven at 110° C. for one hour to remove water. The concentration of PEDOT:PSS in the conductive fibrous substrate was calculated as the difference in weight between the substrate before and after adding PEDOT:PSS. Repetitive drop casting/drying cycles, referred to as "dipping cycles", increased the PEDOT:PSS concentration in the substrate.

Figure 2:
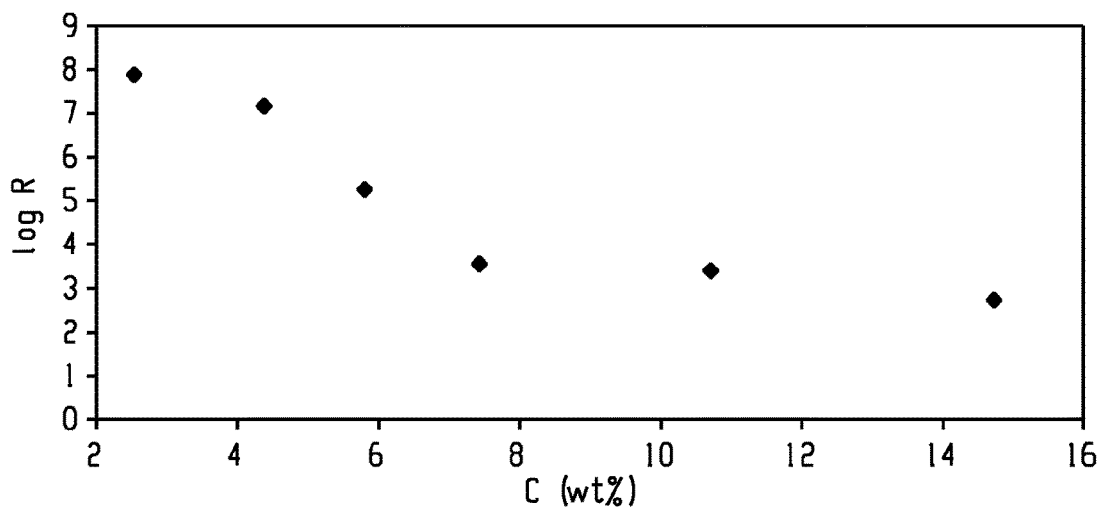
FIG. 2 Sheet resistance as a function of concentration of graphene/graphite infused into the fibrous substrate; the percolation threshold can be observed to be around 7 wt %.

The electrical properties of conductive fibrous substrate having infused graphene/graphite and conductive polymer were determined. Characterization was carried out using a four-line probe method with a Keithley 224 Programmable power supply ($I_{max}$=101.1×10$^{-3}$ A), while a 196 system DMA was used to measure the voltage. Resistance was first measured by creating an I-V plot with at least 10 data points. The sheet resistance Rs was then determined using the relation Rs=R(w/l) where w is the width of the sample and l is the distance between the leads. Table 1 and FIG. 2 shows the sheet resistance as a function of the concentration of graphene in the fabric substrate. The measurements are carried out using a four-line probe technique and all samples have the same area. The sheet resistance decreases with increasing graphene concentration in the substrate. At low concentration, 2.5 wt % graphene in the fabric, the sheet resistance was 77.9 MOhm/sq; while at 7.41 wt %, the sheet resistance was 3.6 KOhm/sq, which means that the sheet resistance decreased by four orders of magnitude. The 7.41 wt % concentration was therefore determined to be the percolation threshold for the sheet resistance because above this concentration a one order of magnitude difference was observed in the sheet resistance with a minimum value of 0.57 KOhm/sq. This value is nearly one order of magnitude lower than the best value reported for graphene in fabric to date.

TABLE 1

| Graphene/Graphite (wt %) | R(Ohm) | Sheet resistance (Ohm/sq) |
| --- | --- | --- |
| 2.5 | 1.09E+07 | 7.79E+07 |
| 4.4 | 2.00E+06 | 1.43E+07 |
| 5.79 | 26584 | 1.90E+05 |
| 7.41 | 504.66 | 3.60E+03 |
| 10.7 | 349.1 | 2.49E+03 |
| 14.7 | 80.41 | 5.74E+02 |

Figure 3A:
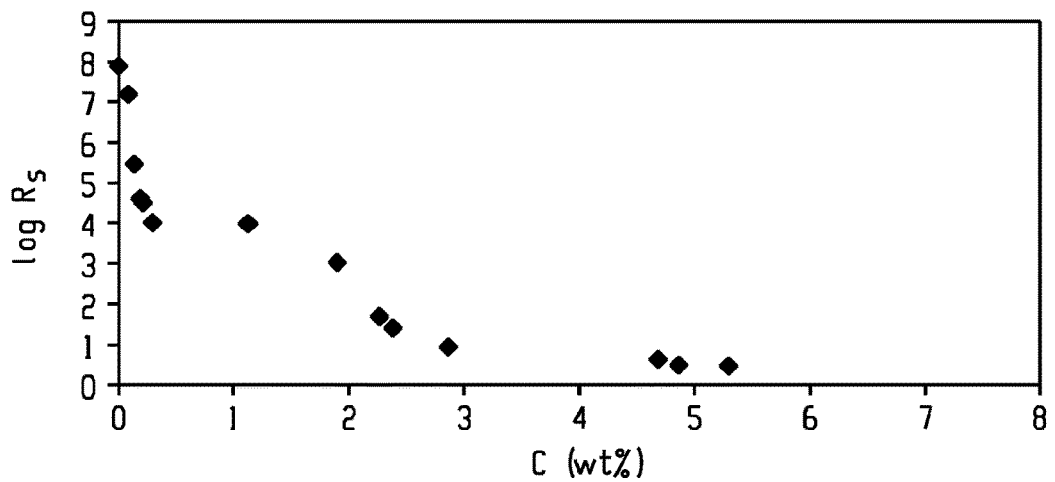
FIG. 3 Sheet resistance as a function of PEDOT:PSS concentration for fibrous substrates containing a mixture of graphene/graphite (A) 2.5 wt %, (B) 4.4 wt %, and (C) 5.79 wt %.
Figure 3B:
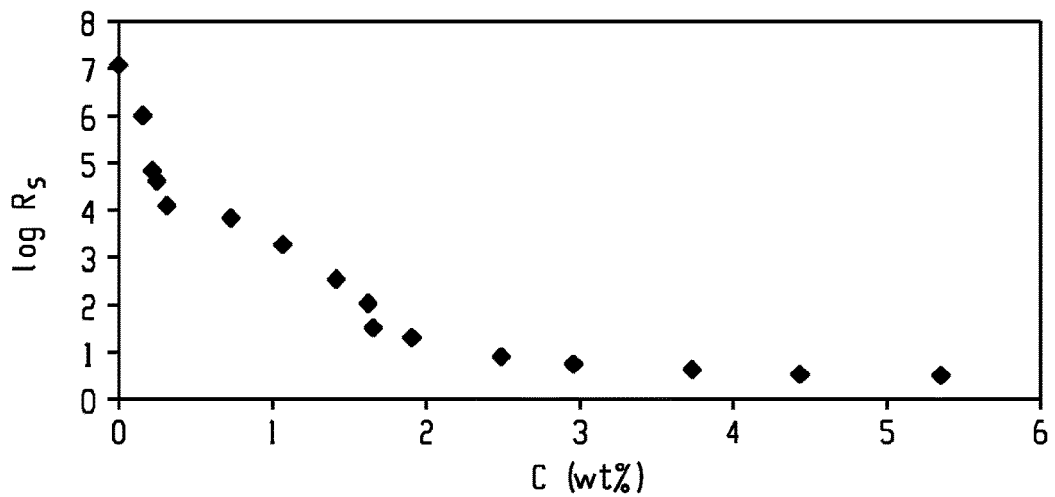
Figure 3C:
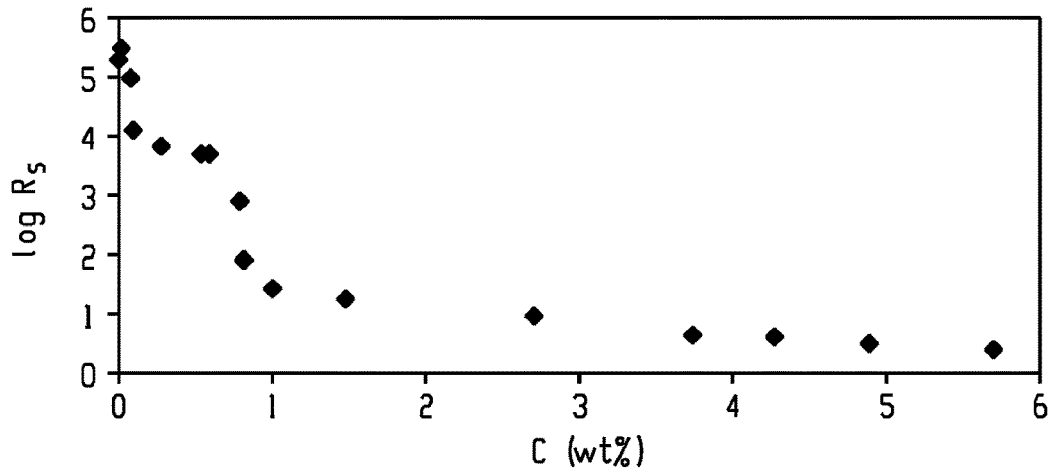
Figure 4:
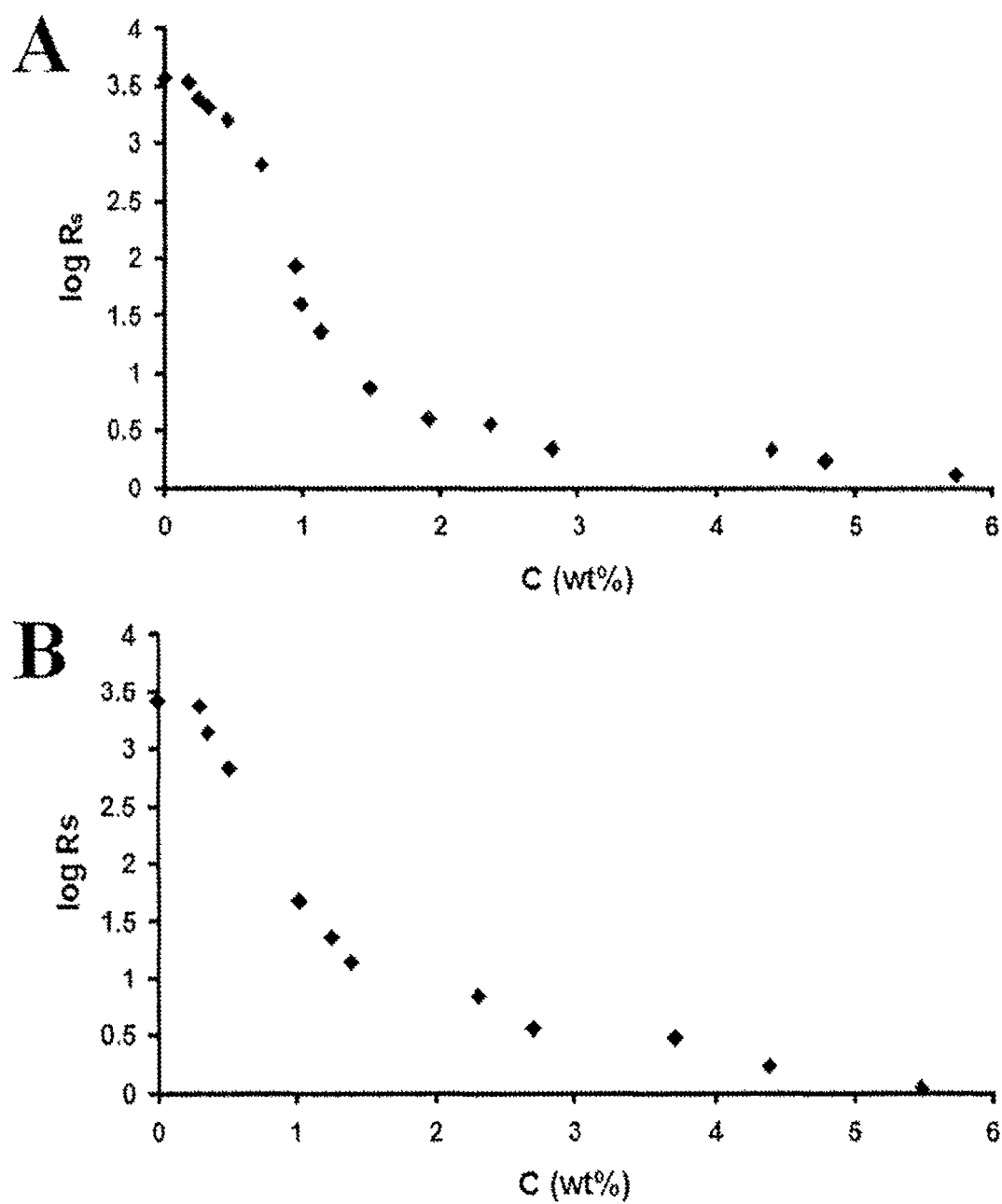
FIG. 4 Sheet resistance as a function of PEDOT:PSS concentration for fibrous substrates containing a mixture of graphene/graphite (A) 7.41 wt % and (B) 10.7 wt %.

The electrical properties of the composite graphene/graphite and PEDOT:PSS conductive fibrous substrate was determined. The effect of the DMSO-doped PEDOT:PSS on the electrical properties of the substrate containing different concentrations of graphene/graphite mix (Tables 2-7) was investigated. The measurements were carried out the same way as described in the section above. Thirteen dipping cycles, drop-casting and drying, were applied to each sample to determine the exact percolation threshold. As shown in FIG. 3 and FIG. 4, the sheet resistance of the fibrous substrate containing graphene/graphite decreases with increasing concentration of PEDOT:PSS. At low graphene/graphite concentrations, 2.5 wt % and 4.4 wt %, the influence of the doped PEDOT:PSS on the sheet resistance was clear, as shown in Tables 2 and 3 with a drop of six and five orders of magnitude, respectively. PEDOT:PSS concentrations of 2.29 wt % and 1.67 wt % were set as percolation thresholds for these two samples since increasing the concentration above theses values did not drop the sheet resistance magnitude (FIG. 3A and FIG. 3B). For the substrate containing 5.79 wt % graphene/graphite, the sheet resistance dropped 3 orders of magnitude from 0.19 MOhm/sq before doping with PEDOT:PSS to 76.59 Ohm/sq at 0.833 wt % PEDOT:PSS and this value was set as the percolation threshold (Table 4 and FIG. 3C). For substrates infused with high graphene/graphite concentrations, 7.41 wt % and 10.7 wt %, the sheet resistance only dropped one order of magnitude (Tables 5 and 6 and FIG. 4A and FIG. 4B).

Table 7 summarizes the lowest sheet resistance achieved versus the total amount of conductive material in the fibrous substrate. By increasing the total amount of the conductors the sheet resistance decreased, reaching a minimum sheet resistance of 1.11 Ohm/sq, at 16.19 wt % of conductors. The lowest sheet resistance achieved was 1.11 Ohm/sq which is the lowest value reported compared to PEDOT:PSS films, PEDOT:PSS in fabric, graphene film, graphene in fabric, and the hybrid PEDOT:PSS and graphene films. Not wishing to be bound by theory, but it is believed that this low sheet resistance was attributed to PEDOT:PSS acting as the primary dopant. Incorporating graphene into the fabric increased the space between molecules leading to an increase in the diffusion coefficient of the charge carrier resulting in increased conductivity.

TABLE 2

Sheet resistance of fibrous substrate containing 2.5 wt % graphene/graphite at different concentrations of PEDOT:PSS

| Cycle | PEDOT:PSS concentration (wt %) | Sheet resistance (Ohm/sq) |
| --- | --- | --- |
| 0 | 0 | 7.79E+07 |
| 1 | 0.063 | 1.43E+07 |
| 2 | 0.137 | 3.05E+05 |
| 3 | 0.174 | 4.78E+04 |
| 4 | 0.211 | 3.59E+04 |
| 5 | 0.285 | 100E+04 |
| 6 | 1.15 | 9.38E+03 |
| 7 | 1.92 | 9.51E+02 |
| 8 | 2.29 | 5.13E+01 |
| 9 | 2.4 | 2.76E+01 |
| 10 | 2.87 | 9.01 |
| 11 | 4.72 | 4.15 |
| 12 | 4.89 | 3.92 |
| 13 | 5.31 | 3.62 |

TABLE 3

Sheet resistance of fibrous substrate containing 4.4 wt % graphene/graphite at different concentrations of PEDOT:PSS

| Cycle | PEDOT:PSS concentration (wt %) | Sheet resistance (Ohm/sq) |
| --- | --- | --- |
| 0 | 0 | 1.43E+07 |
| 1 | 0.146 | 1.15E+06 |
| 2 | 0.216 | 7.81E+04 |
| 3 | 0.256 | 4.34E+04 |
| 4 | 0.296 | 1.57E+04 |
| 5 | 0.736 | 7.38E+03 |
| 6 | 1.07 | 2.24E+03 |
| 7 | 1.43 | 3.83E+02 |
| 8 | 1.636 | 1.22E+02 |
| 9 | 1.67 | 40.9 |
| 10 | 1.92 | 19.6 |
| 11 | 2.49 | 8.71 |
| 12 | 2.96 | 5.06 |
| 13 | 3.73 | 4.58 |
| 14 | 4.43 | 3.53 |
| 15 | 5.34 | 3.10 |

TABLE 4

Sheet resistance of fibrous substrate containing 5.79 wt % graphene/graphite at different concentrations of PEDOT:PSS

| Cycle | PEDOT:PSS concentration (wt %) | Sheet resistance (Ohm/sq) |
| --- | --- | --- |
| 0 | 0 | 1.99E+05 |
| 1 | 0.035 | 3.40E+05 |
| 2 | 0.07 | 9.42E+04 |
| 3 | 0.105 | 1.19E+04 |
| 4 | 0.285 | 6.21E+03 |
| 5 | 0.57 | 4.92E+03 |
| 6 | 0.605 | 4.89E+03 |
| 7 | 0.816 | 7.30E+02 |
| 8 | 0.833 | 76.59 |
| 9 | 1.0 | 26.13 |
| 10 | 1.49 | 16.46 |
| 11 | 2.74 | 8.38 |
| 12 | 3.76 | 4.36 |
| 13 | 4.31 | 3.77 |
| 14 | 4.92 | 3.07 |
| 15 | 5.75 | 2.26 |

TABLE 5

Sheet resistance of fibrous substrate containing 7.41 wt % graphene/graphite at different concentrations of PEDOT:PSS

| Cycle | PEDOT:PSS concentration (wt %) | Sheet resistance (Ohm/sq) |
|---|---|---|
| 0 | 0 | 3607.14 |
| 1 | 0.179 | 3351.14 |
| 2 | 0.25 | 2464.57 |
| 3 | 0.32 | 2065.43 |
| 4 | 0.46 | 1574.57 |
| 5 | 0.71 | 645.48 |
| 6 | 0.96 | 83.58 |
| 7 | 0.995 | 39.75 |
| 8 | 1.137 | 22.88 |
| 9 | 1.492 | 7.52 |
| 10 | 1.922 | 3.92 |
| 11 | 2.372 | 3.64 |
| 12 | 2.8207 | 2.18 |
| 13 | 4.4 | 2.13 |
| 14 | 4.79 | 1.77 |
| 15 | 5.7346 | 1.31 |

TABLE 6

Sheet resistance of fibrous substrate containing 10.7 wt % graphene/graphite at different concentrations of PEDOT:PSS

| Cycle | PEDOT:PSS concentration (wt %) | Sheet resistance (Ohm/sq) |
|---|---|---|
| 0 | 0 | 2607.86 |
| 1 | 0.288 | 2382.14 |
| 2 | 0.356 | 1380.36 |
| 3 | 0.501 | 665.03 |
| 4 | 1.01 | 47.53 |
| 5 | 1.247 | 22.45 |
| 6 | 1.383 | 13.84 |
| 7 | 2.297 | 6.86 |
| 8 | 2.701 | 3.57 |
| 9 | 3.710 | 3.08 |
| 10 | 4.395 | 1.71 |
| 11 | 5.485 | 1.11 |

TABLE 7

Minimum sheet resistance of fibrous substrate versus amount of conductors

| Entry | Mixture graphene/graphite (wt %) | PEDOT:PSS (wt %) | Total conductor (wt %) | Minimum Sheet resistance Rs (Ohm/sq) |
|---|---|---|---|---|
| 1 | 2.50 | 5.31 | 7.81 | 3.62 |
| 2 | 4.40 | 5.34 | 9.74 | 3.10 |
| 3 | 5.79 | 5.75 | 11.54 | 2.26 |
| 4 | 7.41 | 5.73 | 13.14 | 1.31 |
| 5 | 10.70 | 5.48 | 16.19 | 1.11 |

Example 2. Application of a Conductive Fibrous Substrate: Wire in an Electric Circuit A comparative electrical circuit was made using a fibrous substrate (1 inch×1 inch) containing graphene/graphite in series with a power supply and light-emitting diode (LED). A second experiment using a light bulb in place of the LED did not work due to the high resistance (Rs=0.57 KOhm/sq) of the graphene/graphite.

Another electrical circuit was prepared using a fibrous substrate containing graphene/graphite and PEDOT:PSS (1 inch×1 inch, Rs=1.11 Ohm/sq) in series with a 40 watt (W) light bulb and power supply. A direct current of 2 ampere (A) at 20 volt (V) was applied across the fabric and the light bulb was powered to full intensity without sample degradation.

The experiment was then expanded to alternating current (AC) instead of direct current (DC). Higher power light bulbs, 50, 60, and 100 W, were individually connected in series with the hybrid graphene/graphite and PEDOT:PSS conductive fibrous substrate (Rs=1.11 Ohm/sq). All light bulbs were powered to full intensity indicating that the conductive fibrous substrate containing infused graphene/graphite and PEDOT:PSS mimicked a traditional copper wire electrical circuit.

A larger piece of fabric (1 inch×2.5 inch, Rs=1 Ohm/sq) containing 10.6 mg graphene/graphite and 5.78 wt % of the doped PEDOT:PSS was placed in series with an AC power supply and heat light bulb, 250 W, 120 V, to create an electrical circuit comparable to how a normal plug works when plugged wall socket. An AC (2.87 A, 122.3 V) was applied across the fibrous substate and the light was powered to full intensity with no evidence of sample breakdown.

An important application of the hybrid graphene/graphite and PEDOT:PSS fibrous substrate is as a wire in an electrical circuit due to the low sheet resistance and high current that can pass through.

Example 3. The Effect of Temperature on the Resistance of the Conductive Fibrous Substrate The resistance as a function of temperature was studied over a wide temperature range, 10-400° K. The study was carried out on fibrous substrates containing only infused graphene/graphite and fibrous substrates containing infused graphene/graphite and PEDOT:PSS. All samples had an area of 10×5 mm$^2$ and the measurements were made using the standard four-line probe technique with a Physical Property Measurement System (Quantum Design).

Figure 5:
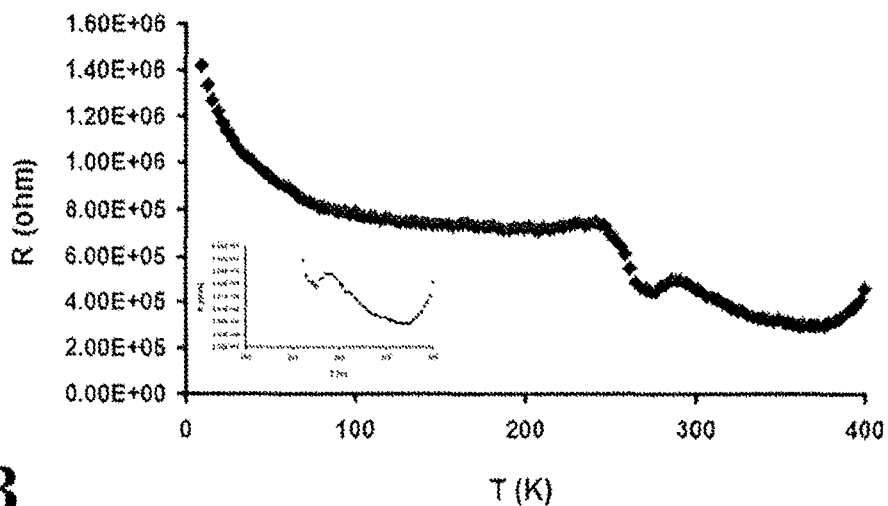
FIG. 5 Resistance versus temperature plot of: (A) and (B) the infused fibrous substrate with 6.20 wt % and 14.74 wt % graphene/graphite and (C) 0.58 wt % doped PEDOT:PSS in fibrous substrate containing 14.74 wt % graphene/graphite; the insets of the figure shows the insulator-metal transition.
Figure 5:
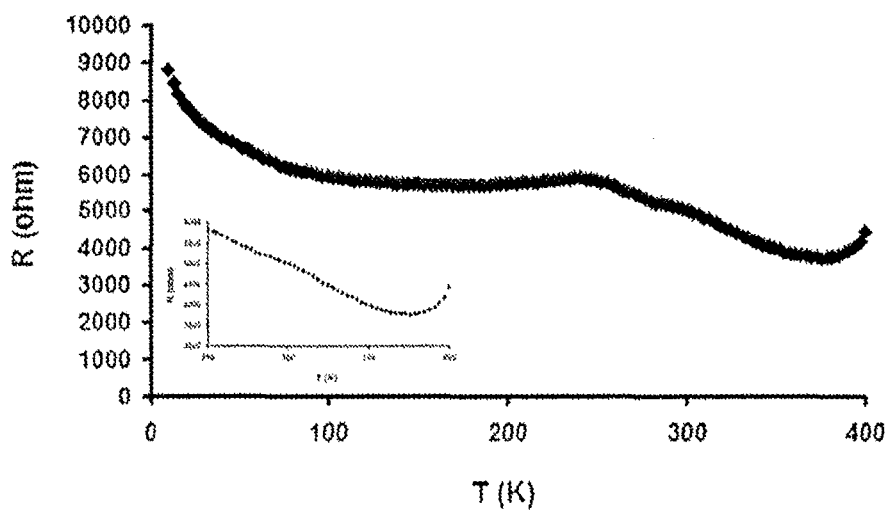
Figure 5:
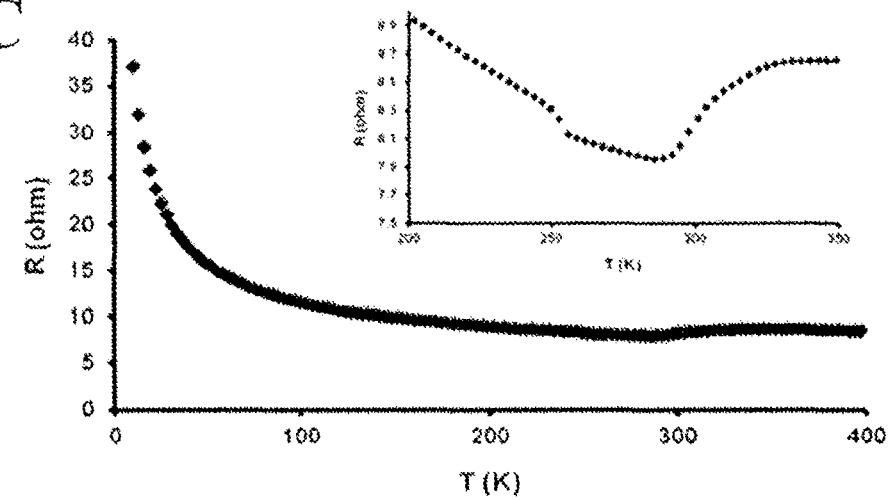

The effect of temperature on the resistance of the infused fibrous substrate containing 6.20 wt % and 14.74 wt % graphene/graphite was investigated. As shown in FIG. 5A and FIG. 5B the resistance shows the same behavior, a decrease in resistance with increasing temperature up to 350° K. This is consistent with semiconducting behavior due to disorder in the graphene/graphite sheet structure at low temperature where electron localization and hopping play a significant role. In the range of 100-250° K, the resistance is relatively constant. The change in the resistance over the entire region is 1 MOhm for 6.2 wt % and 5 KOhm for 14.74 wt %. At 350° K the fibrous substrate undergoes a distinct insulator-metal transition (inset of FIG. 5A and FIG. 5B) which indicates modulation of the band gap from a gap to no gap.

The fibrous substrate containing 14.7 wt % graphene/graphite was treated with 0.58 wt % doped PEDOT:PSS and then the resistance as a function of temperature was measured. The resistance exhibited similar behavior as the untreated graphene/graphite fibrous substrate and PEDOT:PSS treated fibrous substrate over the entire region with two important differences.

The first difference is that the resistance value is approximately 250 times lower compared to the sample prepared with only 14.7 wt % graphene/graphite. The overall resistance change was only 15 Ohm compared to 5 kOhm for graphene/graphite. Not wishing to be bound by theory, the low resistance (high conductivity) of the fibrous substrate containing the hybrid may be explained as the incorporation of graphene into PEDOT:PSS could lead to an increase in the carrier mobility due to increased space between the molecules. In the case of PEDOT:PSS fibrous substrate (no graphene/graphite), the charge transport in PEDOT:PSS occurs through a hopping process, but in the hybrid graphene/graphite and PEDOT:PSS system, the charge transport occurs due to both tunneling and hopping conduction. The incorporation of graphene into PEDOT:PSS may lead to enhanced tunneling conduction at low temperatures and hopping conduction at high temperature. This is because graphene doping leads to increase in the space between molecules resulting in an increase in the diffusion coefficients of the charge carriers. Furthermore, graphene doping PEDOT:PSS decreases the disorder strength leading to an increase in the charge mobility and thus an increase in conductivity.

The second difference is that in the hybrid graphene/graphite and PEDOT:PSS system there is a shift in the insulator-metal transition temperature from 365° K for graphene/graphite alone to 300° K for the hybrid graphene/graphite and PEDOT:PSS system.

As shown, highly conductive, metallic behaving fibrous substrate using a mixture of graphene/graphite and PEDOT:PSS was prepared.

Example 4. Morphology Study

Figure 6:
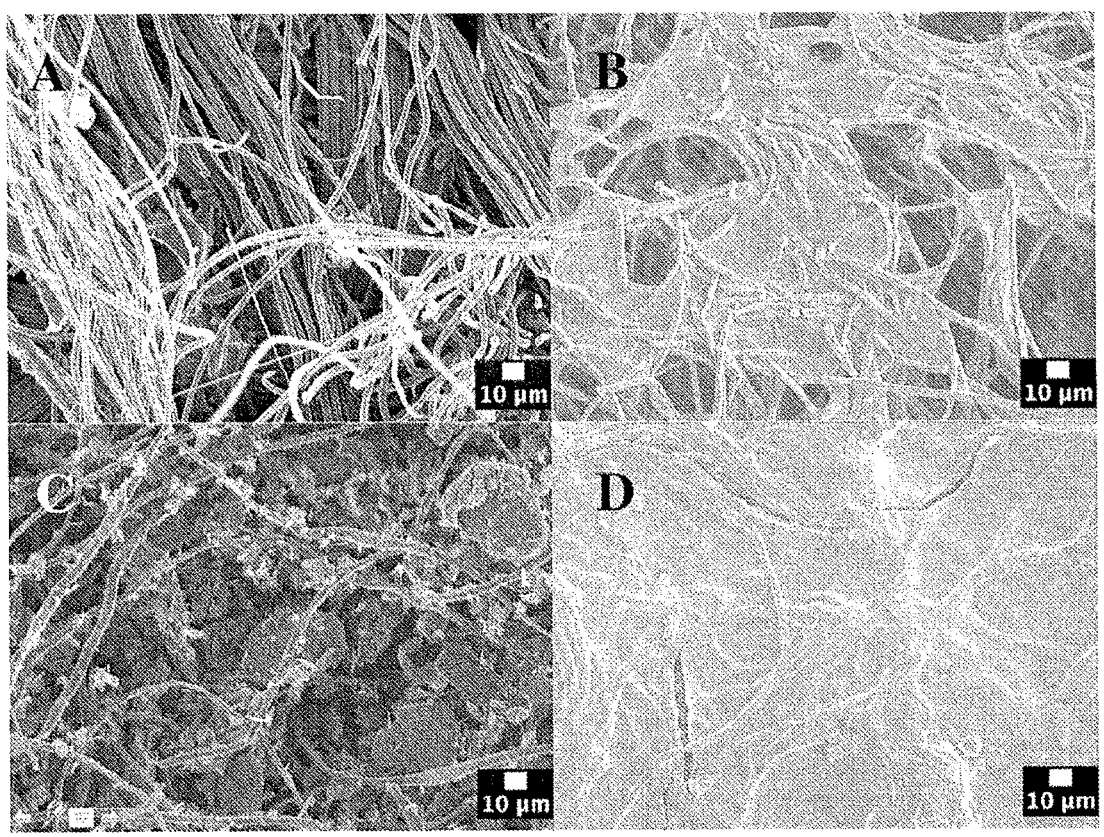
FIG. 6 Scanning Electron Microscopy Images for (A) untreated fibrous substrate, (B) fibrous substrate treated with PEDOT:PSS, (C) fibrous substrate treated with the graphene/graphite, and (D) fibrous substrate treated with graphene/graphite and PEDOT:PSS.

Morphological tests were performed with a field emission scanning electron microscope (JEOL 6335 FESEM). FIG. 6A illustrates the fibrous substrate before treatment. Some slight bundling of the individual fibers is observed. The images taken of the fibrous substrate coated with PEDOT:PSS seem to infer that the coating is primarily on the surface of the fabric, as the surface tension of the fluid holds it between the fibers (FIG. 6B). There is, however, still some that penetrates deeper into the sample. In FIG. 6C, the fibrous substrate only treated with the graphene/graphite mixture is shown. These images show how the substrate's fibers are coated with pristine graphene, while the bulk graphite is caught between the fibers, which act somewhat like a net. The amount of graphite in the sample is thought to decrease closer to the middle. The final image, FIG. 6D, shows the fibrous substrate with the combination of PEDOT:PSS and graphene/graphite. Since the infusion with PEDOT:PSS is performed after the infusion of graphene/graphite, the graphitic material is sealed inside. In the image, some particles of graphene/graphite are apparent under the wrinkles in the coating.

Example 5. Mechanical Properties Study

Figure 7:
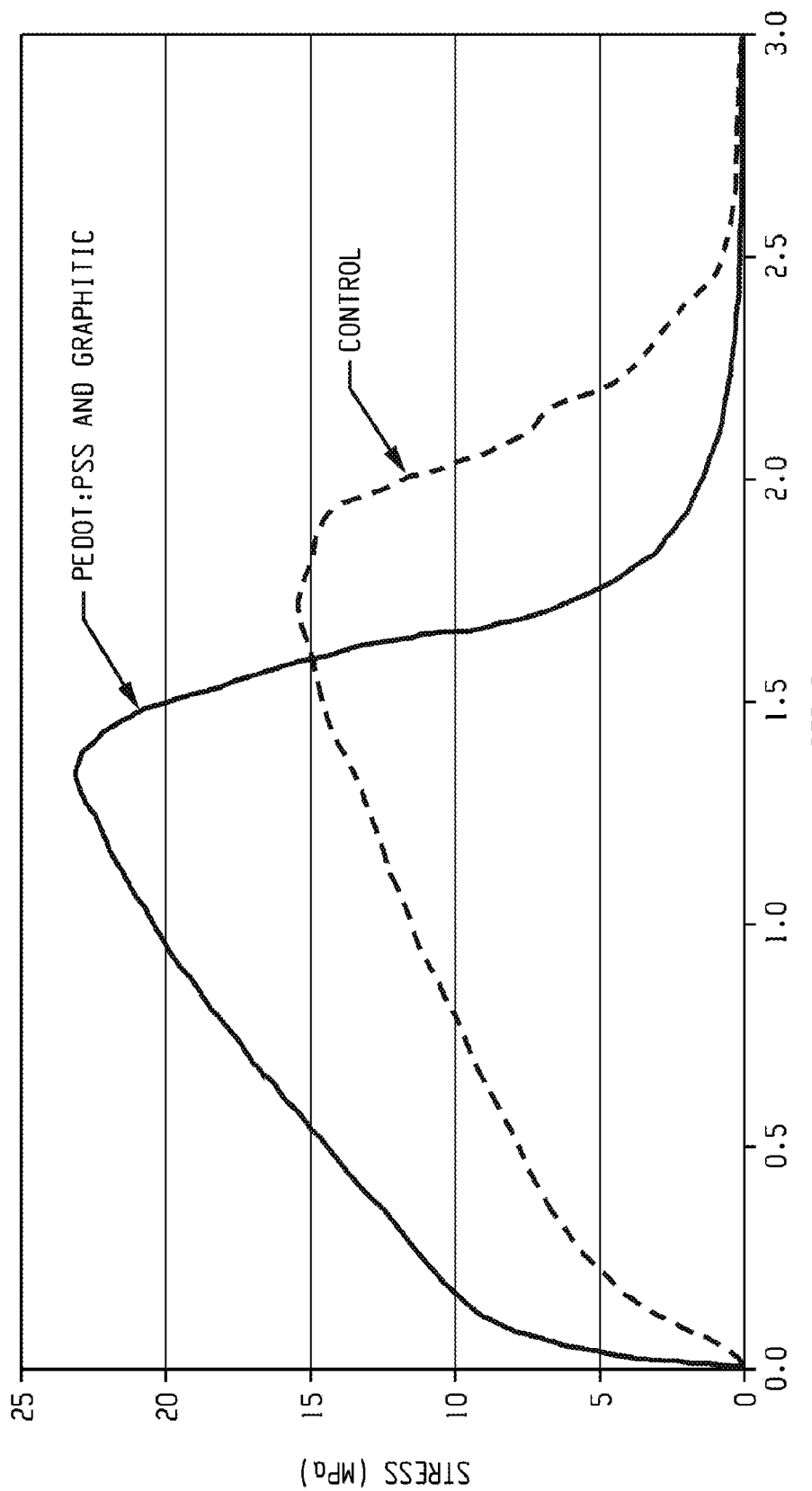
FIG. 7 Stress-Strain Curve for the untreated fibrous substrate and fibrous substrate infused with graphene/graphite and PEDOT:PSS.

The graphene/graphite and PEDOT:PSS infused fibrous substrate was also tested against a control in an Instron Model 1011 for tensile strength. There was a small strength increase in the treated fibrous substrate when compared to the control (FIG. 7). Looking at the scanning electron microscope images, one can see that the conductive polymer connects the fibers of the substrate. This bridging is thought to be the source of the increased strength.

Example 6. PET Fibrous Substrate Without the Presence of $SiO_2$ Desiccant Particles A conductive fibrous substrate prepared from a PET fibrous substrate free of $SiO_2$ desiccant particles was prepared according the two-step procedure described above in Example 1. The resistance was measured as previously described and the sheet resistance was then determined; the results are provided in the first three columns of Table 8. These results can be compared with the results of the PET fibrous substrate containing $SiO_2$ desiccant particles in Example 1, Table 6, the relevant data of which has been included in the last two columns of Table 8.

TABLE 8

Sample PET fibrous substrate without silica; amount of graphene/graphite = 13.2 wt %; comparison with PET fibrous substrate containing $SiO_2$ desiccant particles

| Amount of PEDOT:PSS in the fabric containing 13.2 wt % graphene/graphite | Resistance (R, Ohm) | Sheet Resistance ($R_s$, Ohm/sq) | Amount of PEDOT:PSS (wt %) With silica (10.7 wt % Graphene/Graphite) from Table 6. | Sheet Resistance ($R_s$, Ohm/sq) |
|---|---|---|---|---|
| 0 (just graphene/graphite) | 5884 | 42028.5 | 0 | 2607.86 |
| 2.0 | 1.69 | 12.07 | | |
| 2.5 | 0.653 | 4.66 | 2.701 | 3.57 |
| 3.4 | 0.432 | 3.32 | | |
| 4.5 | 0.325 | 3.08 | 4.395 | 1.71 |
| 5.0 | 0.233 | 1.66 | | |
| 6.3 | 0.184 | 1.31 | 5.485 | 1.11 |

The singular forms "a," "an," and "the" include plural referents unless the context clearly dictates otherwise. The endpoints of all ranges directed to the same characteristic or component are independently combinable and inclusive of the recited endpoint.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description, but is only limited by the scope of the appended claims.

What is claimed is:

1. An electrically conductive fibrous substrate, comprising:
   a fibrous substrate comprising fibers, wherein the fibers are polymeric fibers comprising desiccant particles wherein a portion of the desiccant particles are located at the surface of the polymeric fibers;
   an electrically conductive polymer; and
   a conductive organic particle, wherein the fibrous substrate is infused with the electrically conductive polymer and conductive organic particle.

2. The electrically conductive fibrous substrate of claim 1, wherein the conductive organic particle is graphene, graphite, a combination of graphene and graphite, carbon nanotubes, buckyballs, "n-type" small molecules, or a combination thereof.

3. The electrically conductive fibrous substrate of claim 2, wherein the graphene, graphite or graphene and graphite is present in an amount of about 0.2 to about 20 wt % based on the total weight of the electrically conductive fibrous substrate.

4. The electrically conductive fibrous substrate of claim 1, wherein the electrically conductive polymer is poly(3,4-ethylenedioxythiophene):poly(styrene sulfonate), a poly(3,4-ethylenedioxythiophene), a substituted poly(3,4-ethylenedioxythiophene), poly(thiophene), a substituted poly(thiophene), poly(pyrrole), a substituted poly(pyrrole), poly(aniline), a substituted poly(aniline), poly(acetylene), poly(p-phenylenevinylene) (PPV), a poly(indole), a substituted poly(indole), a poly(carbazole), a substituted poly(carbazole), a poly(azepine), a (poly)thieno[3,4-b]thiophene, a substituted poly(thieno[3,4-b]thiophene), a poly(dithieno[3,4-b:3',4'-d]thiophene), a poly(thieno[3,4-b]furan), a substituted poly(thieno[3,4-b]furan), a derivative thereof, or a combination thereof.

5. The electrically conductive fibrous substrate of claim 1, wherein the electrically conductive polymer is present in an amount of about 0.1 to about 16 wt % based on the total weight of the electrically conductive fibrous substrate.

6. The electrically conductive fibrous substrate of claim 1, wherein the electrically conductive polymer is poly(3,4-ethylenedioxythiophene):poly(styrene sulfonate) present in an amount of about 0.1 to about 16 wt % based on the total weight of the electrically conductive fibrous substrate.

7. The electrically conductive fibrous substrate of claim 1, wherein the desiccant particles are $SiO_2$, $TiO_2$, aluminum oxide, calcium oxide, or a combination thereof.

8. The electrically conductive fibrous substrate of claim 1, wherein the desiccant particles have a particle size of about 1 nanometer to about 500 nanometers.

9. The electrically conductive fibrous substrate of claim 1, wherein the desiccant particles are present in an amount of about 0.01 to about 6.0 wt % by weight in the fiber.

10. The electrically conductive fibrous substrate of claim 1, wherein the fiber is nylon 6, nylon 66, nylon 610, nylon 12, co-polymerized nylon, polyethylene terephthalate, polytrimethylene terephthalate, polybutylene terephthalate, polypropylene terephthalate, polyurethane, polypropylene, polyethylene, polyurethane-polyurea copolymer, polyester-based polyurethane, copolymers thereof, or a combination thereof.

11. The electrically conductive fibrous substrate of claim 1, further comprising a dopant.

12. The electrically conductive fibrous substrate of claim 1, which exhibits sheet resistances ranging from about 0.15 to about 10 Ohms/square.

13. The electrically conductive fibrous substrate of claim 1, which exhibits metallic behavior at temperatures above 20° C.

14. The electrically conductive fibrous substrate of claim 1, used as an electrode, an electrically conducting wire, replacement for indium tin oxide or copper wiring, an electrochromic display, used as a component in an electronic device, thin film batteries and energy storage, transparent solar cells, RFID, sensors, electric contacts, thermoelectrics, or smart textiles.

15. A method of making an electrically conductive fibrous substrate, comprising:
    infusing a fibrous substrate with a conductive organic particle to form a conductive organic particle infused fibrous substrate; and
    infusing the conductive organic particle infused fibrous substrate with an electrically conductive polymer to form an electrically conductive fibrous substrate;
    wherein the fibrous substrate comprises polymeric fibers comprising desiccant particles wherein a portion of the desiccant particles are located at the surface of the polymeric fibers.

16. The method of claim 15, wherein the electrically conductive polymer is drop cast, spray coated, ink jet coated, dip coated, spin coated, gravure coated, extrusion coated onto the fibrous substrate as a suspension.

17. The method of claim 15, wherein the conductive organic particle is graphene, graphite or graphene and graphite.

18. The method of claim 15, comprising infusing a fibrous substrate with graphene and graphite using an interfacial method.

19. An electrically conductive fibrous substrate, comprising:
    a fibrous substrate comprising polymeric fibers comprising desiccant nanoparticles wherein a portion of the desiccant particles are located at the surface of the polymeric fibers;
    poly(3,4-ethylenedioxythiophene):poly(styrene sulfonate); and
    graphene, graphite, or graphene and graphite,
    wherein the fibrous substrate is infused with the poly(3,4-ethylenedioxythiophene):poly(styrene sulfonate) and graphene, graphite, or graphene and graphite.

* * * * *